United States Patent [19]

Geffroy et al.

[11] Patent Number: 4,986,168
[45] Date of Patent: Jan. 22, 1991

[54] PISTON AND MULTILAYER PISTON RING SET

[76] Inventors: Robert Geffroy, 1 Boulevard Richard Wallace, 92200 Neuilly s/Seine, Paris; Christophe Geoffroy, 18 rue Charles Laffitte, 92200 Neuilly/Seine, both of France; Lloyd M. Forster, 1827 Golf Ridge Dr., Bloomfield Hills, Mich. 48013

[21] Appl. No.: 293,072

[22] Filed: Jan. 3, 1989

[51] Int. Cl.⁵ ............................ F16J 9/06; F16J 9/16; F16J 9/24
[52] U.S. Cl. ...................................... 92/194; 277/197; 277/199; 277/220; 277/222; 29/888.07; 29/888.076
[58] Field of Search ................................ 92/193–194, 92/196–201, 211; 277/193–195, 197, 199, 220–222, 136–137, 148, 150, 151, 155, 156, 160, 203; 29/888.07, 888.071, 888.073, 888.076

[56] References Cited

U.S. PATENT DOCUMENTS

| | | | |
|---|---|---|---|
| Re. 32,395 | 4/1987 | Geoffroy | 92/212 |
| 1,097,069 | 5/1914 | Wright | 277/148 X |
| 1,106,462 | 8/1914 | Kytlica | 277/194 X |
| 1,698,074 | 1/1929 | Solenberger | 92/200 X |
| 1,796,791 | 3/1931 | Johnson | 277/160 X |
| 1,933,943 | 11/1933 | Towell | 92/193 X |
| 2,117,986 | 5/1938 | Robertson | 277/160 X |
| 2,283,056 | 5/1942 | Guardiola | 277/136 X |
| 2,468,980 | 5/1949 | Huber | 92/193 X |
| 3,295,857 | 1/1967 | Lutz | 277/136 X |
| 3,391,943 | 7/1968 | Riley | 277/137 X |
| 3,625,526 | 12/1971 | McCormick | 277/151 |
| 4,570,945 | 2/1986 | Hayashi | 277/197 |
| 4,615,531 | 10/1986 | Green | 277/197 X |

FOREIGN PATENT DOCUMENTS

| | | | |
|---|---|---|---|
| 2448634 | 10/1980 | France | 277/195 |
| 85883 | 7/1957 | Netherlands | 277/137 |
| 304540 | 1/1929 | United Kingdom | 277/151 |

Primary Examiner—Edward K. Look
Assistant Examiner—George Kapsalas
Attorney, Agent, or Firm—Lloyd M. Forster

[57] ABSTRACT

Compression piston ring for internal combustion or compressor cylinder and piston comprising double layer of segmented ring sectors having free form circumferential curvature matching the cylinder bore. The double layers are adapted to effectively seal or minimize bypass with resilient means provided for maintaining ring cylinder engagement under light radial pressure.

18 Claims, 3 Drawing Sheets

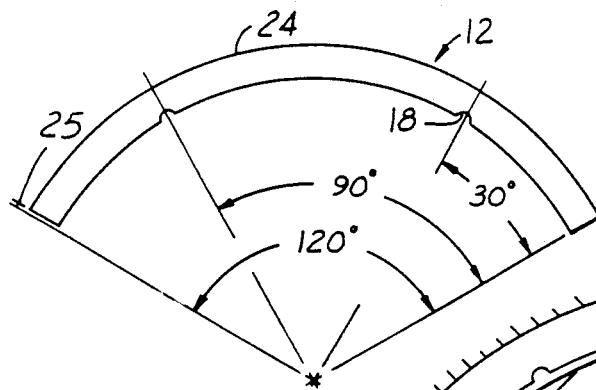
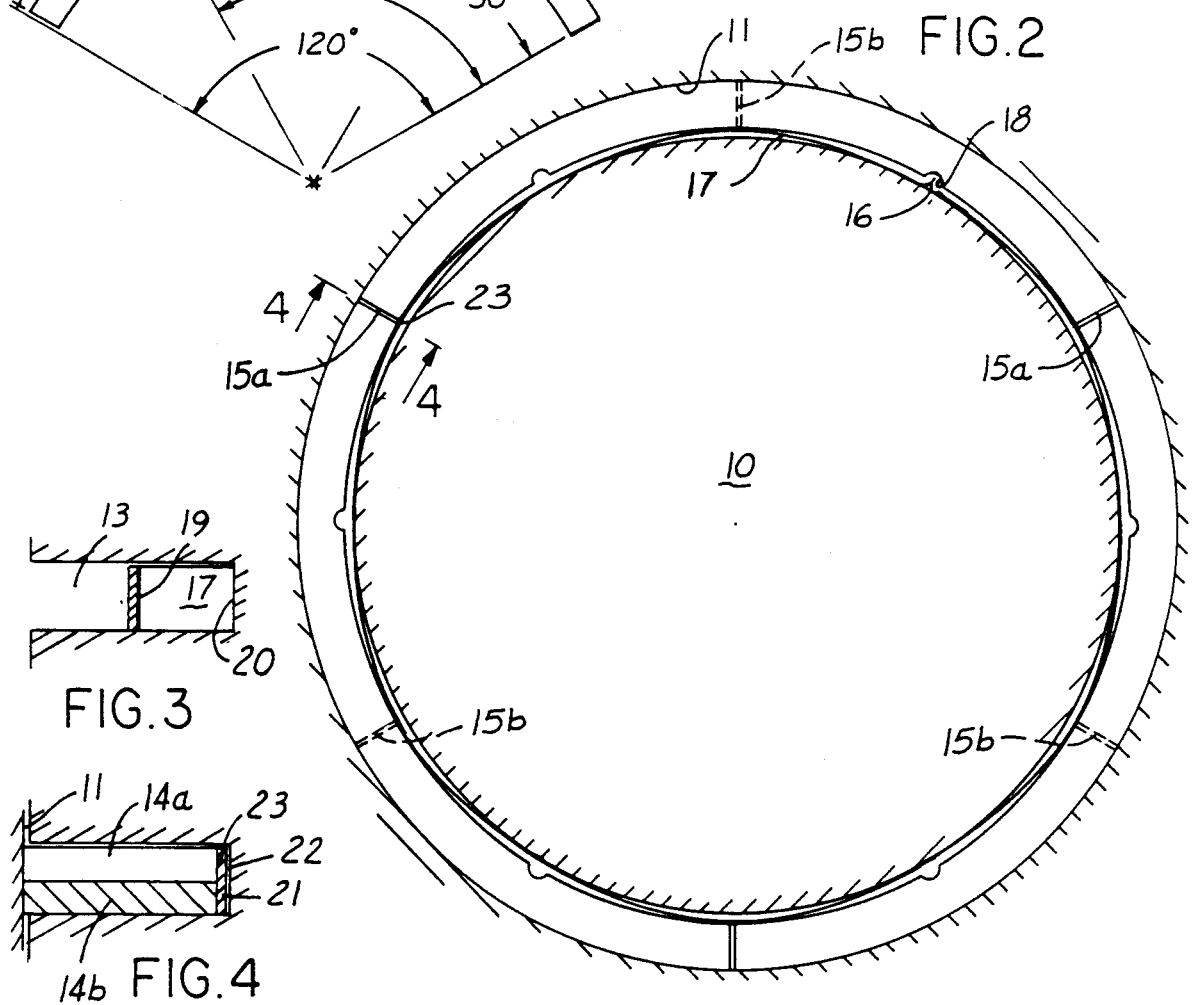
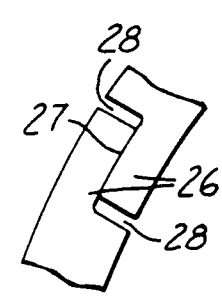
FIG. 1
FIG. 2
FIG. 3
FIG. 4
FIG. 5
FIG. 6

PISTON AND MULTILAYER PISTON RING SET

BACKGROUND OF THE INVENTION

Reissue Patent, Re. No. 32,395 discloses several forms of compression piston ring construction including a thin multi-sector ring having free circumferential curvature equal to the cylinder wall wherein each sector is provided with a "microspring" formed by partial radial cuttings leaving a spring element therebetween. Each of the three sectors is made slightly greater than 120°, so that circumferential compression upon installation will maintain radial cylinder wall contact with sufficient microspring clearance remaining at the cuttings to accommodate thermal expansion in operation. As a sealing element for clearance gaps at the microsprings, a supplemental single piece plastic ring, made of a material such as Teflon capable of operation without gap at its single cutting ends, is disclosed for installation under the metal ring sectors on the crankcase side to seal against any leakage through the microspring partial cuttings.

Such supplemental plastic sealing ring has been found satisfactory in operation where temperatures do not exceed 400°; however, higher operating temperatures in the order of 500° encountered in high performance engines exceed the operating temperature limits of the plastic.

SUMMARY OF THE INVENTION

In order to accommodate higher temperature operation, a second layer of segmented metal ring sectors is employed in a manner dispensing with the plastic ring.

In a first embodiment, microsprings are omitted and each sector is identically constructed with slightly less than 120° arc to provide end clearance for thermal expansion, with a wave spring employed at the inside of the piston groove to urge the segments into radial contact with the cylinder wall. A slight notch in a sector of each layer engaged by a single slight projection in the wave spring maintains an overlapping orientation of the respective layers so that every end gap is covered by the adjacent layer. As an additional provision to block single layer radial leak paths, the wave spring is configured with a width equal to the combined thickness of the metal sectors, and with convolutions spaced to engage the segments of both layers at every sector end.

In a second embodiment, ends of the sectors are constructed with overlapping tongue extensions which maintain contact against radial passage throughout all thermal conditions with sufficient end clearance provided for maximum thermal expansion.

In a third embodiment, each layer comprises three metal sectors, each identically constructed with a microspring similar to the disclosure in said reissue patent, and with circumferential interengagement provided to assure interlayer overlap coverage of each layer's microspring gaps.

In a fourth embodiment, the microsprings in respective layers are differently spaced to assure no possible axial alignment of microsprings at more than one location, notwithstanding absence of any relative circumferential orientation between layers.

BRIEF DESCRIPTION OF THE DRAWINGS

FIG. 1 is a plan view of a single sector employed in the first embodiment;

FIG. 2 is an enlarged sectional plan view of a piston ring and cylinder assembly employing six of the segments shown in FIG. 1;

FIG. 3 is a greatly enlarged fragmentary sectional view illustrating a free-state assembly of the wave spring shown in FIG. 2 installed in a piston groove;

FIG. 4 is a view similar to FIG. 3 taken along the line 4—4 of FIG. 2 illustrating the wave spring compressed by piston ring sectors installed in the piston;

FIG. 5 is a fragmentary enlarged view of the second embodiment having overlapping tongue ends of adjacent sectors;

FIG. 6 is a fragmentary further enlarged view of one overlapping joint taken from the circle 6 of FIG. 5;

DETAILED DESCRIPTION OF THE PREFERRED EMBODIMENTS

Figure 7:
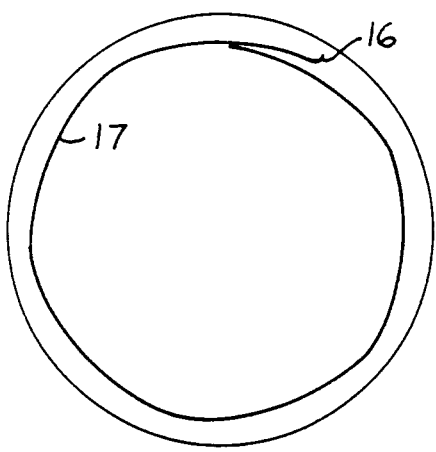
FIG. 7 is a plan view of a wave spring in a free state condition prior to installation in the piston groove.

With reference to FIGS. 1-4, piston 10 installed within cylinder wall 11 has six metal compression ring sectors 12 installed within piston groove 13 in two 3-sector layers, 14a and 14b held in overlapping relationship with respective ends such as 15a of one layer extending midway between adjacent ends 15b of the other layer. Such relationship is maintained by a single projection 16 of wave spring 17 engaging a pair of aligned notches 18 in one segment of each of the layers. Wave spring 17 shown with groove installed free convolution extension 19 in FIG. 3 is compressed with intermediate contact against groove bottom 20 to an operating position 21 with only slight clearance 22 relative to groove bottom 20. As shown in FIG. 2, each convolution of wave spring 17 is spaced relative to projection 16 to directly engage respective ring sectors at each juncture 23, to effectively block any radial leak path through either layer.

Outer perimeter 24 of each sector is provided with a free form curvature matching cylinder wall 11 and extends through an arc slightly less than 120° providing clearance 25 adequate for thermal expansion without compressive end loading.

With reference to FIGS. 3 and 7, each convolution of the wave spring extension preferably is formed to span the bottom of the groove during radial compression by ring installation to an operating condition as shown in FIGS. 2 and 4. The radial inner connection between each radially extending convolution should contact the bottom of the groove in tangential relation with a radiused bend at said connection to establish a free state contracted ring configuration relative to the circumference of the groove bottom shown as a reference outer circle in FIG. 7. This is provided to require ring expansion for installation with resulting opening stress throughout when installed as shown in FIG. 3. Such stress permits retention of groove bottom contact as the extended convolution is radially compressed by ring sector installation.

Ends of the wave spring should also be radiused to maintain spanning contact during radial compression so that bore contact pressure will be limited to the radial force required to substantially conform the respective radially extending convolutions to approach groove bottom curvature. In establishing the required free form for radial projecting convolutions, formulae for beams freely supported at the ends deflected by concentrated force at the center have approximate application using the deflection curve in reverse as the free form curve for a convolution which will compress toward the piston groove bottom with its ends engaging the bottom. However, in some respects, the connection between convolutions creates a condition similar to a beam fixed at both ends with a load at the center. This again is not accurately representative of the condition because the connection between convolutions does not completely fix the ends against angular deflection upon radial compression of the projecting convolutions. Accordingly, applicants have found experimentally, that provision of a free form approaching deflection of a beam supported at both ends with a load at the center, supplemented by a slight uniform radius bend at the end connections of the projecting convolutions to produce a reduced preformed circumference corresponding to that illustrated in FIG. 7, with a similar curvature applied to the respective ends of the wave spring will produce the desired result such as illustrated in FIG. 2. A desired light radial spring force only sufficient to maintain ring contact with the cylinder bore during operation is readily achieved with appropriate wave spring thickness and convolution spacing, thereby minimizing piston friction which contributes to substantial power loss with conventional integral expansion rings.

Optionally, a thinner spring may be employed when configured to wrap on the groove bottom when deflected by ring sector installation due to decreasing effective spring length rather than spanning contact; or as another alternative by providing more convolutions with shorter spanning contacts. With such alternative configurations, spring thickness in the order of 0.05 to 0.10 millimeter may be employed. However, the preferred embodiment with spanning contacts as illustrated in FIG. 2 involve greater spring thickness for equivalent radial force on the ring sectors which may be a substantial fraction of the height engaging the dual ring layers appropriate for construction by flattening round spring wire to the required substantially rectangular wave spring section.

Typical ring dimensions appropriate for an 82 millimeter cylinder bore diameter are 0.6 millimeter thickness for each layer, 3.6 millimeter radial width, 0.03 millimeter axial groove clearance, 0.2 millimeter end gap per sector for thermal expansion (approximately 1° sum of three gaps), and a wave spring of approximately 0.5 millimeter thickness.

With reference to FIGS. 5 and 6, the modified second embodiment provides overlapping mating tongue extensions 26 with arcuate expansion joint 27 and thermal expansion clearance gaps 28 to effectively block radial passage at each layer. Such provision may be in lieu of or in addition to wave spring contact at the joints.

Figure 8:
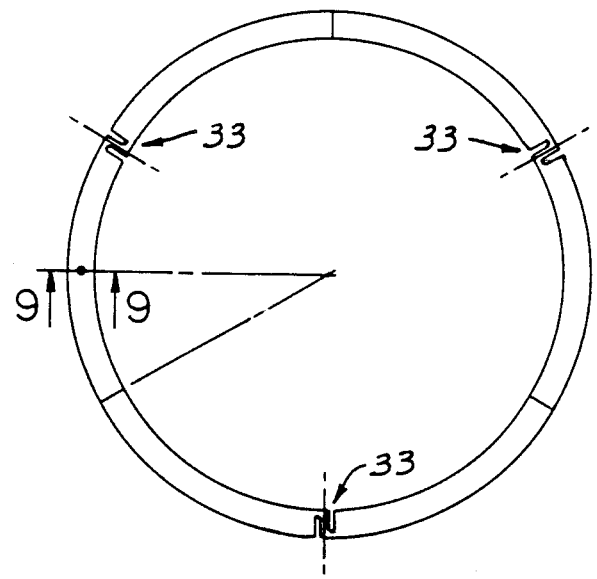
FIG. 8 is a plan view of one layer of three sectors employed in the third embodiment with two overlapping layers each having three identical microspring sectors.
Figure 9:
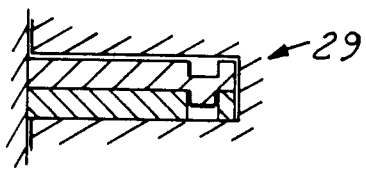
FIG. 9 is an enlarged fragmentary sectional view of a piston groove with two layers of FIG. 8 sectors installed.
Figure 10:
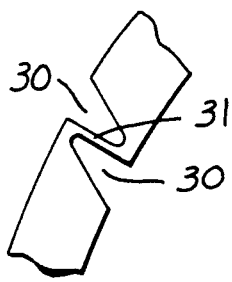
FIG. 10 is a fragmentary view of a modified microspring.

With reference to FIG. 8, the third embodiment employs double layer microspring sectors held in relative overlapping orientation by suitable means such as the hole and semipierce projection 29 illustrated in FIG. 9 with adequate clearance therebetween for free axial clearance as shown. In FIG. 10, a modified triangular partial cut is provided at 30 on either side of microspring 31 to facilitate manufacture by stamping with more body for the punch elements. The enlarged axial passages of such modification are not detrimental when completely covered by the adjacent layer.

Figure 11:
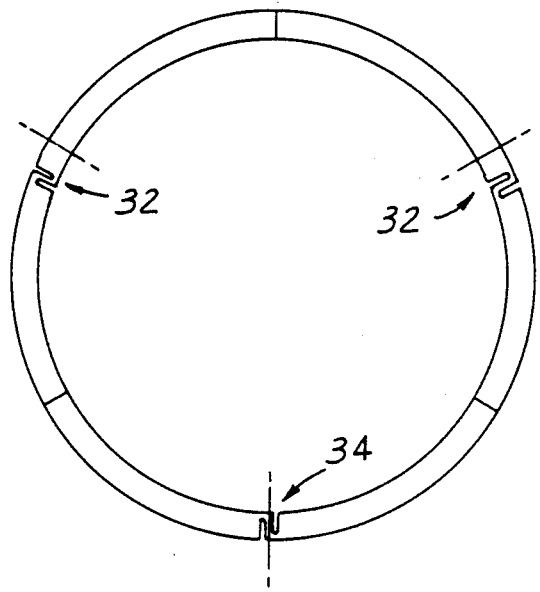
FIG. 11 is a plan view of a second layer of three sectors employed in the fourth embodiment.

With reference to FIG. 11, the second layer of three sectors employed in the fourth embodiment, having nonuniform spacing of microsprings in two of the three segments as shown at 32 and one sector having a central microspring as shown at 34, when combined with the layer shown in FIG. 8 having uniformly spaced microsprings as shown at 33, assures an axial alignment of microsprings at no more than one location, with chances approximately 359:1 against such alignment, thereby minimizing potential leakage through axially aligned microsprings. In this case, the partial cutting gaps forming the microsprings are held to a minimum width to allow for initial compression on installation plus thermal expansion in operation.

Figure 12:
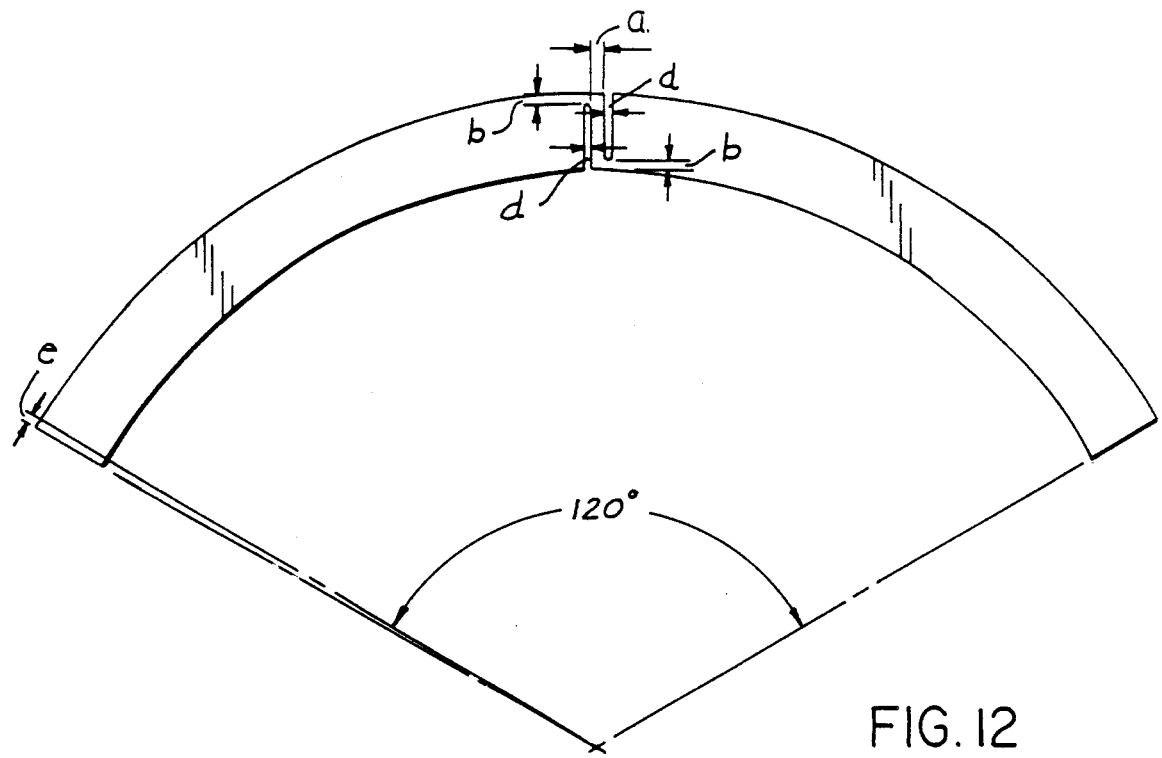
FIG. 12 is an enlarged view of a single sector with a microspring typical of those shown in FIGS. 8 and 11.

With reference to FIG. 12, appropriate dimensions in millimeters, for the partial cutting gaps and microspring illustrated are approximately a=0.40; b=0.55; d=0.30; and e=0.07; the last figure accommodating initial compression partially closing the gaps d. As in the case of the first two embodiments, a thickness of 0.6 millimeters, radial width of 3.60 millimeters and outer circumferential radius of 41 millimeters are appropriate.

In the operation of the FIG. 1 and 2 embodiments, there is no requirement for the ring segments per se to have spring properties. Accordingly, materials other than spring stock may be employed which will have optimum compatibility with bore surface, effective compression seal, low friction, and durability as well as to facilitate manufacturing processes such as fine blanking, or optionally using coiled rectangular wire stock from which ring sectors may be cut.

Figure 13:
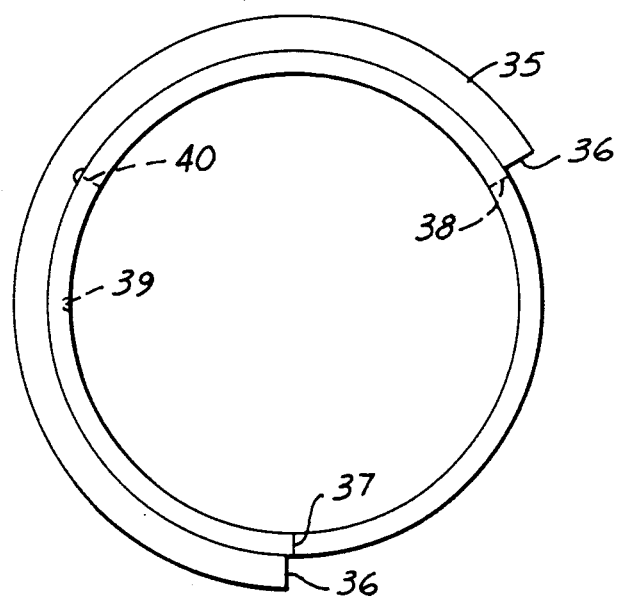
FIG. 13 is a plan view of a sleeve for a spring coil from which 120° sectors are to be cut in manufacturing ring sectors.

With reference to FIG. 13, an example of tooling which may be used in cutting segment sectors from coiled stock is illustrated, including a tooling sleeve 35 extending for slightly less than 240° having ends 36 adjacent sector cut lines 37 and 38 of the coiled spring which has been prewound and accurately finished to required outside and inside surfaces before installation in the sleeve, particularly with reference to the OD which may be precision ground to exactly match the cylinder bore. End caps, not shown, may be employed to compressively retain the stacks of coiled sectors during the cutting. In cutting through the entire coil at the end location 37 by slitting saw or thin cutoff disc, the opposite end of the coil will be preferably located directly under the end 37, so that separate layers will result from the initial cut with a shift of one layer to produce alignment of each single coil layer. Upon making a second cut at 120° spacing 38 from the first cut at 37, a stack of 120° sector segments will result opening the interior of the coil to further processing. At this stage, a single notch 39 may be produced in the entire length of the remaining coil by suitable cutting or grinding tool followed by a final cut at 40 to complete the processing of three segments per layer for the entire coil. The gap resulting from cutting the three 120° sectors will be appropriate for thermal expansion required in the first embodiment with virtually no significant loss of material from the initial wire stock employed in producing the coil.

The provision of a single notch 39 in one of the three sectors of each ring will require turning over one of the two notched layers in order to achieve the overlap condition illustrated in FIG. 2. Optionally, a second notch could be provided at a 30° spacing from end 37 to eliminate the requirement for such turnover orientation at assembly so that merely a proper indexing of the respective layers will achieve required alignment of a pair of notches 18 as illustrated in FIG. 2.

In the case of fine blanking, two corresponding notches could readily be provided in all segments so that no segment segregation would be required for assembly purposes. However, in case of the processing illustrated in FIG. 13, corresponding notches in the first stack of segments removed by initial cutting would require additional processing setup and selective orientation, including turnover of alternate sectors, incident to the single notch illustrated may be preferred to secondary processing steps for additional notches.

In view of the multiplicity of six ring segments in addition to the wave spring for assembly in each piston compression ring groove, automatic assembly techniques may be in order which, however, are outside of the scope of the present application. Likewise, in the case of the wave spring partial fabrication at assembly to produce the six radially projecting convolutions and end projection 16, would permit prefabrication of flat wire stock in substantial continuous quantity on a reel located at assembly which would feed the spring wire to forming and cutoff rolls adjacent the piston ring groove so that direct, automatic feeding of the formed wave spring into the piston groove may be accomplished. It would of course be necessary to develop such rolls empirically with proper allowance for spring back to achieve the desired groove installation form as illustrated in FIG. 3 and the necessary expanding stress incident to a free form such as illustrated in FIG. 7.

While the manufacturing process illustrated in FIG. 13 is not appropriate for other than the first embodiment, fine blanking may readily be employed to produce the segments of the second embodiment illustrated in FIGS. 5 and 6.

We claim:

1. An assembly comprising a cylinder for internal combustion engine or compressor extending between a compression head and a crank case, a piston, and piston ring set reciprocable within said cylinder characterized by a single pair of contiguous layers, each equally circumferentially segmented in equal circular arc segments providing metal compression ring means in a single piston groove with free axial clearance, each segment being provided with free form circumferential curvature substantially equal to said cylinder wall, further characterized by said pair of segmented metal ring layers within said single groove having interlayer sealing means against blowby, and resilient means for maintaining light dual layer radial ring segment contact pressure against each cylinder wall.

2. The assembly of claim 1 including piston compression rings made in independent multiple sector segments having an outer curvature matching a predetermined cylinder bore and an inner curvature providing a radial dimension appropriate for extension within a piston groove, comprising segments of a continuous coil of rectangular cross section wire in a close wound cylindrical helix with outer and inner surfaces accurately sized with required curvature dimensions, said segments comprising an initial stack of approximately 120° sector segments cut from said continuous coil, and the remaining coil being cut to form two separate additional stacks of sector segments.

3. The assembly of claim 1 including means at one only single circumferential location to maintain relative orientation of said layers during operation.

4. The assembly of claim 3 wherein said last means includes integral interengaging projection means at said single location.

5. The assembly of claim 3 wherein said last means comprises axially aligned single notch means in the radially inner edges of respective layer segments, and common single projection means engaging the bottom of said groove and said single notches means.

6. The assembly of claim 1 wherein integral microspring means in said segments comprise said resilient means.

7. The assembly of claim 6 wherein microsprings in respective layers are nonuniformly spaced to avoid axial alignment of more than one pair of microsprings in said respective layers.

8. The assembly of claim 6 wherein microsprings are formed by partial triangular openings for opposite edges with an intermediate spring element.

9. The assembly of claim 1 wherein adjacent ends of said segments are provided with overlapping tongue extensions to maintain individual layer radially sealing contact throughout all thermal operating conditions, the ends of said tongues including clearance accommodating circumferential thermal expansion.

10. The assembly of claim 2 wherein the respective ends of said coil prior to cutting align in a single radial plane along one margin of said first stack of sector segments.

11. The assembly of claim 2 wherein a notch is located at approximately 30° from the center of the 240° remainder of said coil.

12. The assembly of claim 2 wherein the cut through at each of the three locations of said coil is effected by a thin tool providing cumulative gaps of an order sufficient to accommodate thermal expansion in the operating circumference of three sectors.

13. The assembly of claim 1 wherein wave spring means reacting against the bottom of said groove and the radially inner surface of all segments of both layers comprise said resilient means.

14. The assembly of claim 13 wherein the sector extension of each segment is slightly less than 120° to provide appropriate gaps for thermal expansion in assembled operation.

15. The assembly of claim 14 wherein wave spring convolutions are spaced to contact adjacent ends of all segments.

16. The assembly of claim 15 wherein pre-ring groove installed wave convolutions extend to only partial groove radius to facilitate ring segment insertion.

17. The assembly of claim 16 wherein wave convolutions are preformed with means to maintain spanning contact with the bottom of the groove during compression by ring insertion to operating position.

18. The assembly of claim 17 wherein said wave spring means has a free form undersize requiring spring stressed expansion for groove installation including means whereby radial compression of extending convolutions by ring installation will have continuing spanning contact without bulging at the connection between adjacent convolutions.

* * * * *